(12) United States Patent
Lai et al.

(10) Patent No.: US 7,668,067 B2
(45) Date of Patent: *Feb. 23, 2010

(54) POWER CONTROL DEVICE AND METHOD OF MULTI BASE POWERS FOR OPTICAL DISK DRIVE

(75) Inventors: Ronnie Lai, Shindian (TW); Ronald Chen, Shindian (TW)

(73) Assignee: Via Technologies, Inc., Shindian, Taipei (TW)

( * ) Notice: Subject to any disclaimer, the term of this patent is extended or adjusted under 35 U.S.C. 154(b) by 610 days.

This patent is subject to a terminal disclaimer.

(21) Appl. No.: 11/429,942

(22) Filed: May 9, 2006

(65) Prior Publication Data

US 2007/0171804 A1 Jul. 26, 2007

Related U.S. Application Data

(63) Continuation-in-part of application No. 11/339,798, filed on Jan. 26, 2006.

(60) Provisional application No. 60/646,633, filed on Jan. 25, 2006.

(51) Int. Cl.
*G11B 7/00* (2006.01)

(52) U.S. Cl. .................................................. 369/116

(58) Field of Classification Search ................... None
See application file for complete search history.

(56) References Cited

U.S. PATENT DOCUMENTS 6,775,216 B2 * 8/2004 Kelly et al. ............... 369/53.37
7,242,660 B2 * 7/2007 Lai et al. .................... 369/116
2005/0073268 A1 * 4/2005 Schrodinger et al. ........ 315/291
2006/0164901 A1 * 7/2006 Lai et al. .................... 365/215

* cited by examiner

*Primary Examiner*—Joseph H Feild
*Assistant Examiner*—Joseph Haley
(74) *Attorney, Agent, or Firm*—Bacon & Thomas, PLLC (57) ABSTRACT

A power control device of multi base powers is provided for an optical read/write module of an optical disk drive. The optical read/write module generates a power feedback signal and a temperature signal. The power control device includes a base power selecting module, a current compensating module, a current computing module and a current integrating module. The base power selecting module selects one of a first base power signal and a second base power signal to output a base power signal. The current compensating module generates an operating current compensating signal and a threshold compensating signal according to the power feedback signal, the temperature signal, the base power signal and a function relationship between the temperature signal and the threshold current of the optical read/write module. The current computing module receives the operating current compensating signal to compute a first operating current signal, a second operating current signal and a third operating current signal based on the operating current compensating signal according to the base power signal and a reference power signal. The current integrating module receives the threshold current compensating signal, the first operating current signal, the second operating current signal and the third operating current signal to generate a power control signal to drive the optical read/write module.

18 Claims, 10 Drawing Sheets

POWER CONTROL DEVICE AND METHOD OF MULTI BASE POWERS FOR OPTICAL DISK DRIVE

BACKGROUND OF THE INVENTION

1. Field of Invention

The invention relates to a power control device and a method thereof and, in particular, to a power control device and a method thereof of multi base powers for an optical disk drive.

2. Related Art

An optical read/write module of an optical disk drive is easily affected by heat thus the performance and accurate of the electric device may be influenced. In order to control the electric device at different temperatures, a proper control module must be designed to modify the affection resulted from the thermal factor.

Figure 1:
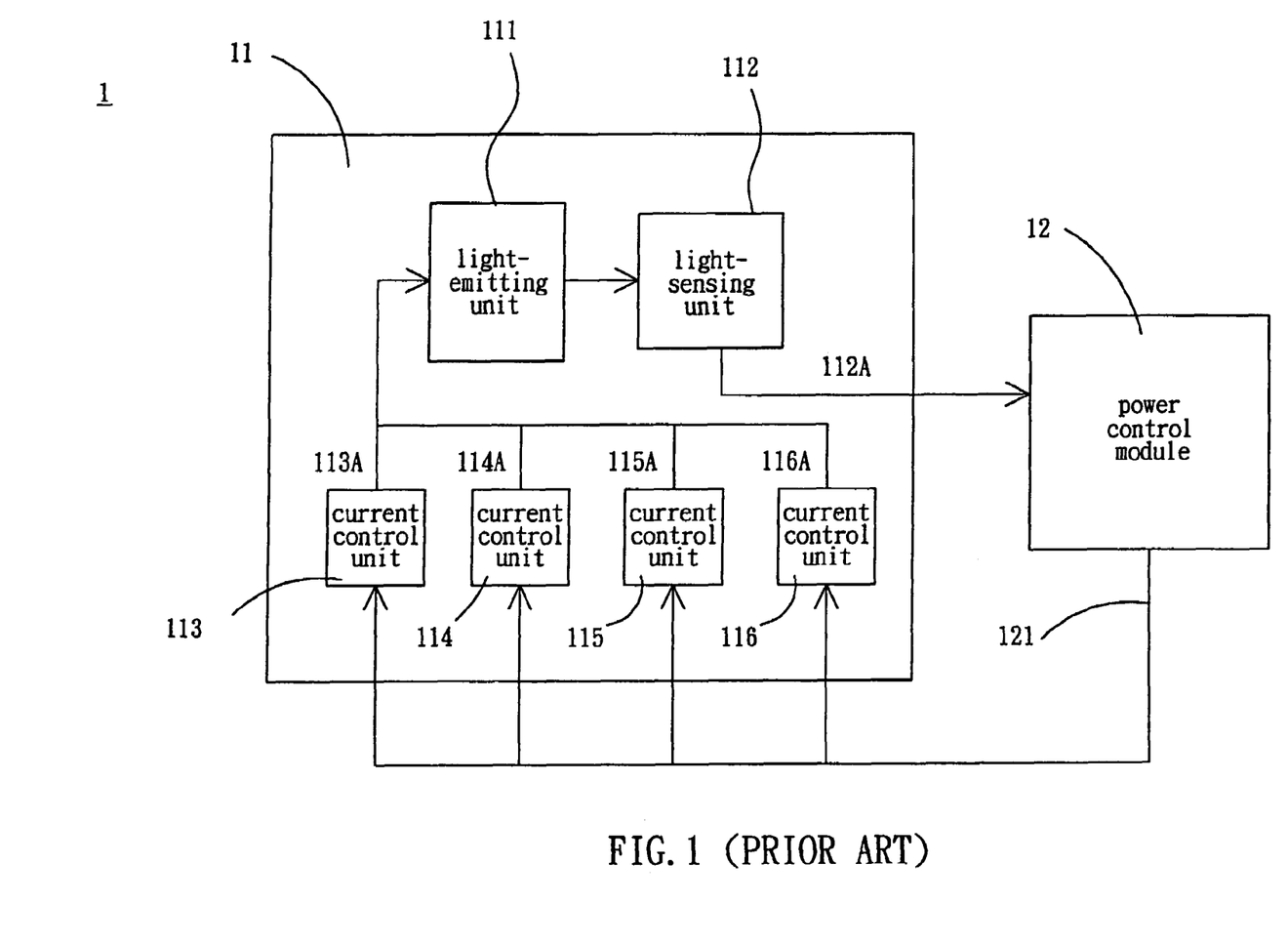
FIG. 1 is a block diagram showing the power control structure of the optical read/write module in the optical disk drive.

Referring to FIG. 1, an optical disk drive 1 includes an optical pickup module 11 and a power control module 12. The optical pickup module 11 includes a light-emitting unit 111, a light-sensing module 112, and a plurality of current control units 113, 114, 115 and 116. The light-sensing module 112 detects the output power of the light-emitting module 111 and generates a power feedback signal 112A. The power control module 12 determines whether the output power of the light-emitting unit 111 reaches a target value according to the power feedback signal 112A, and generates a power control signal 121 according to the determination. In addition, the current control units 113 to 116 modulate the currents 113A to 116A according to the power control signal 121, respectively. Therefore, after being driven by the currents 113A to 116A, the light-emitting unit 111 generates the output power reaching the target value.

Figure 2:
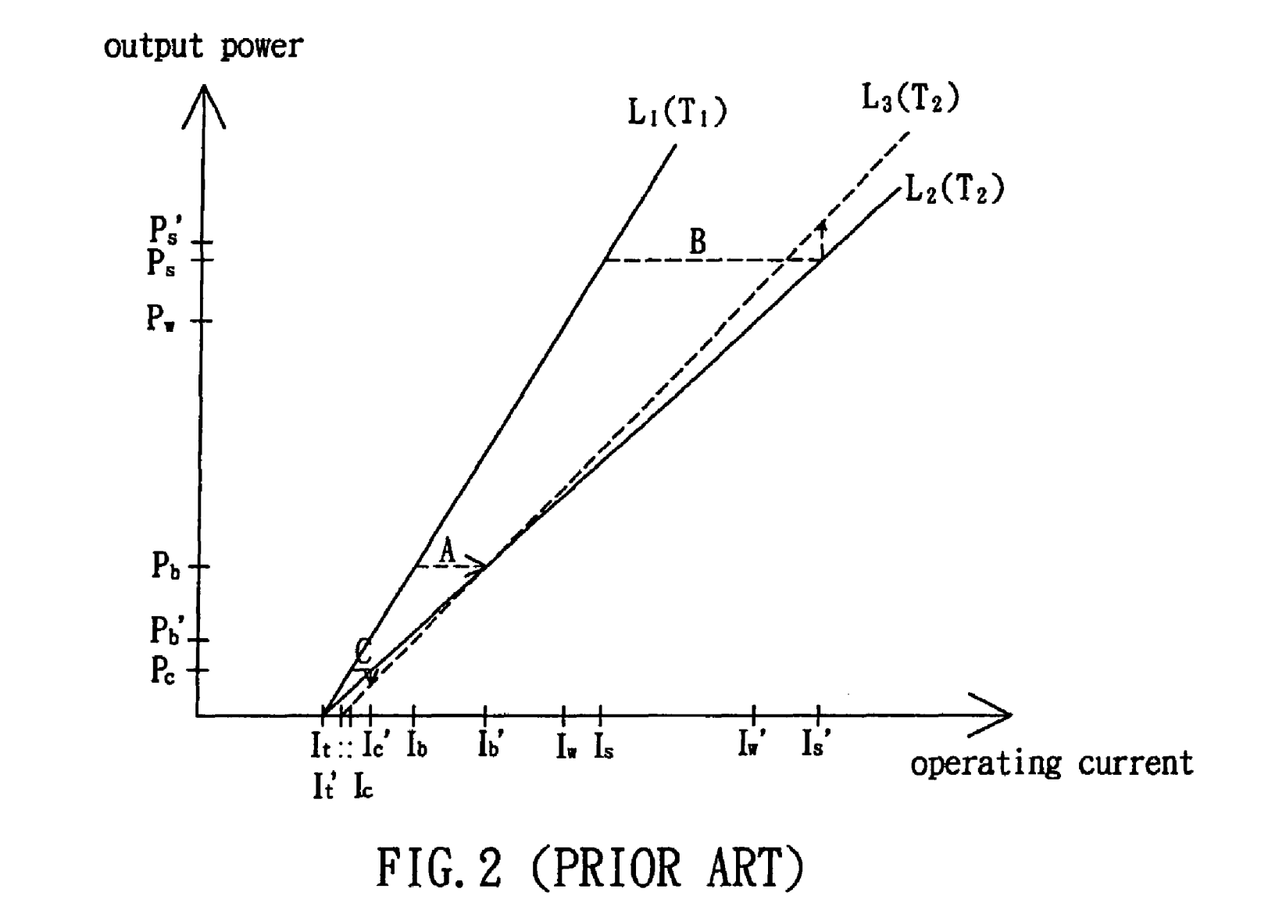
FIG. 2 is a curve relation diagram showing the output power and the operating current of the conventional light-emitting unit.

Referring to FIG. 2, when the light-emitting unit 111 is at a temperature T1, the output power and the operating current of the light-emitting unit 111 are related in a line L1. In other words, when the operating temperature of the light-emitting unit 111 is at the temperature $T_1$ and the operating current is at currents $I_c$, $I_b$, $I_w$, or $I_s$, the light-emitting unit 111 generates the output power at powers $P_b$, $P_e$ or $P_w$.

In order to control the operating currents generated by the light-emitting unit 111 exactly at the different powers, the conventional power control module 112 controls the currents 113A, 114A, 115A and 116A respectively to be equal to the current $I_c$, the current $I_b$ minus the current $I_c$, the current $I_w$ minus the current $I_b$, and the current $I_s$ minus the current $I_w$. Besides, the light-emitting unit 111 can be driven by the different combinations of the currents 113A to 116A.

For example, if the power control module 12 controls the light-emitting unit 111 to generate the output power at the power $P_b$, the current control units 113 and 114 are enabled by the power control module 12. Therefore, the light-emitting unit 111 is driven only by the currents 114A (current $I_c$) and 115A (current $I_b$ minus current $I_c$) to generate the output power at the power $P_b$.

On the other hand, if the temperature of the light-emitting unit 111 rises to a temperature $T_2$, the power control module 12 increases the operating current of the light-emitting unit 111 (as dotted line A) with a closed feedback control method based on the power $P_w$ according to the power feedback signal 112A until the output power of the light-emitting unit 111 reaches the power $P_w$. Besides, for accurately controlling the output power of the light-emitting unit 111 at temperature $T_2$, the power control module 12 increases the operating current of the light-emitting unit 111 (as dotted line A) with a closed feedback control method based on the power $P_b$ until the output power of the light-emitting unit 111 reaches the power $P_b$. Herein, the output power of the light-emitting unit 111 is controlled by a double-base power controlling method.

Take the power $P_w$ as the base power for an example, the operating current of the light-emitting unit 111 is still equal to the current $I_w$, such that the light-emitting unit 111 generates the output power at the power $P_w'$. In order to adjust the output power of the light-emitting unit 111 to the power $P_s$, the power control module 12 computes the current $I_s'$ resulting in the power $P_s$ according to the current $I_w$ and the relationship between the power $P_w$ and the power $P_s$, as shown in formula 1.

$$I_w' = \frac{P_w}{P_c}(I_c' - I_c) + I_w \quad (1)$$

In addition, A current $I_c'$ and $I_b'$ resulting in the power $P_c$ and $P_b$ is computed in the same computing method. Therefore, the power control module 12 can control the currents 113A, 114A, 115A and 116A respectively be equal to the current $I_c'$, the current $I_b'$ minus the $I_c'$, the current $I_w$ minus the $I_b$ and the current $I_s'$ minus the $I_w'$. Accordingly, the light-emitting unit 111 is able to generate the output power at different powers ($P_c$, $P_b$, $P_w$ and $P_s$) at the temperature $T_2$. In brief, the conventional technology is to compute the operating-currents of the light-emitting unit 111 to generate the output power at different powers at the temperature $T_2$ according to the line $L_2$.

Figure 3:
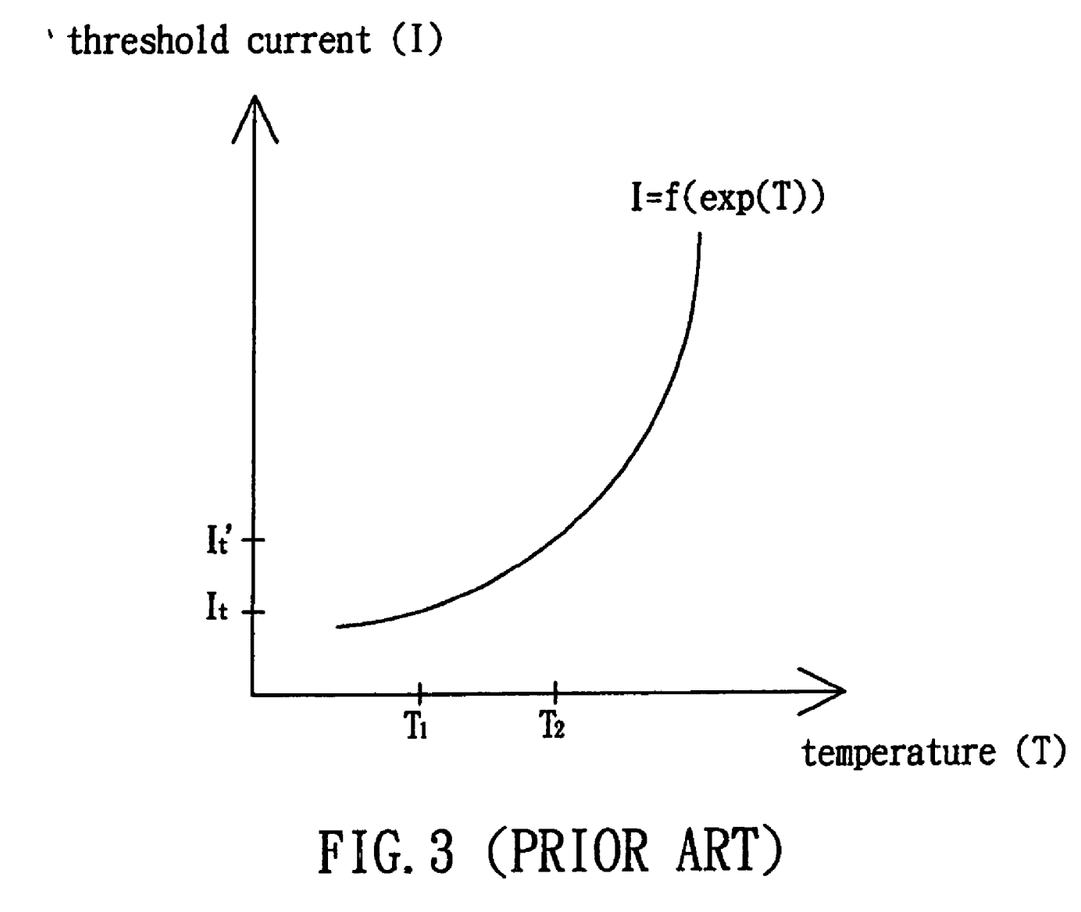
FIG. 3 is a curve relation diagram showing the temperature and the threshold current of the conventional light-emitting unit.

However, when the light-emitting unit 111 actually reaches the temperature $T_2$, the output power and the operating current of the light-emitting unit 111 are not related in the line $L_2$ but a line $L_3$. Therefore, the operating current computed according to the conventional technology is the current $I_s'$, so that the light-emitting unit 111 generates the output power at power $P_s'$ (as dotted line B), which is not correctly controlled at power $P_s$. In the same manner, the light-emitting unit 111 does not generate the output power at power $P_c$ correctly. More particularly, the power $P_w$ and $P_b$ of the light-emitting unit 111 can be accurately controlled by the above-mentioned feedback method. The errors in the above cases are caused by that the conventional technology ignores the threshold-current $I_t$ and $I_t'$ (intersection points of line $L_1$ and line $L_3$ with the current axis, respectively). As shown in FIG. 3, the temperature of the light-emitting unit 111 is in exponential relation to the threshold-current. If the threshold-current is insufficient, the operating-current computed by the conventional technology for obtaining the output power at different temperature would not have an obvious error. However, if the threshold-current is sufficient or the output power is to be precisely controlled, the error of the operating-current computed by the conventional technology is inevitable.

Figure 4:
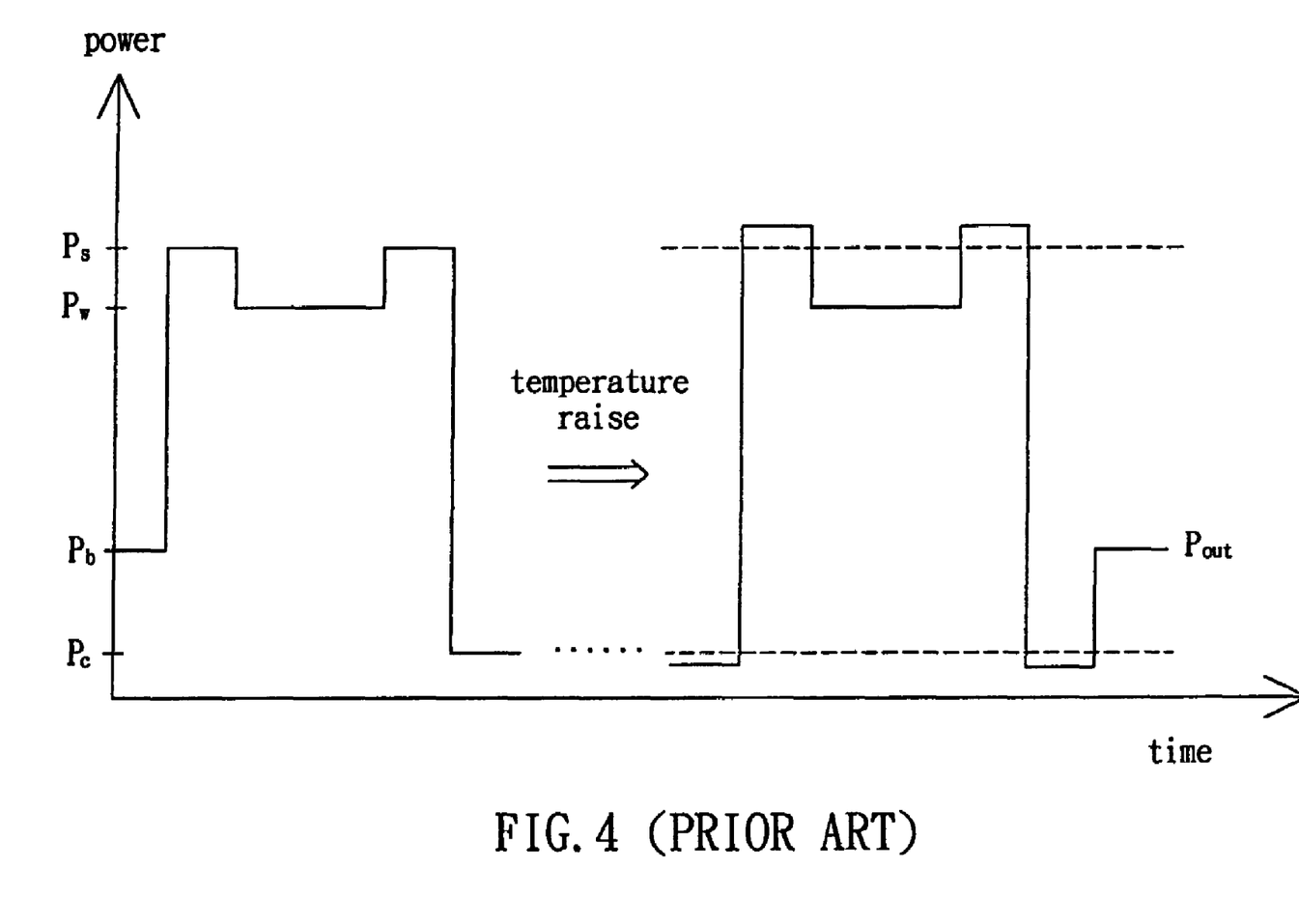
FIG. 4 is a schematic view showing the conventional light-emitting unit generates the output power in the castle writing strategy.

Referring to FIG. 4, the light-emitting unit 111 of the conventional optical pickup module 11 generates the output power $P_{out}$ to access an optical disk by a repeat writing controlling way. If the temperature of the light-emitting unit 111 changes (for example, increasing the temperature), the output power $P_{out}$ is well controlled at the writing power $P_w$ and bias power $P_b$ but not the writing power $P_w$ and cooling power $P_c$ due to the regardless of the threshold-current. Further, according to the increase of the temperature, the output power $P_{out}$ lapses from the writing power $P_w$ and cooling $P_c$ (the dotted line in FIG. 4). And, the optical pickup module 11 can not access the optical disk. Therefore, the optical pickup module 11 does not correctly access the optical disk, and, even more, the lifetime of the optical pickup module 11 and the endurance of the optical disk drive 1 are reduced.

It is therefore a subject of the invention to provide an optical disk drive with multi-power-baseline control, which considers an effect of the threshold current of the optical read/write module in the optical disk drive at different temperature, and computes the operating current for driving the optical read/write module to generate the distinct output power according to a single power-baseline. Thus, the output power of the optical read/write module can be precisely controlled.

SUMMARY OF THE INVENTION

In view of the foregoing, the invention is to provide a power control device and method of multi base powers, which control the optical read/write module to generate correct output power according to the temperature and the output power of the optical read/write module.

To achieve the above, a power control device of multi base powers is provided for an optical read/write module of an optical disk drive. The optical read/write module generates a power feedback signal and a temperature signal. The power control device includes a base power selecting module, a current compensating module, a current computing module and a current integrating module. The base power selecting module selects one of a first base power signal and a second base power signal to output a base power signal. The current compensating module generates an operating current compensating signal and a threshold compensating signal according to the power feedback signal, the temperature signal, the base power signal and a function relationship between the temperature signal and the threshold current of the optical read/write module. The current computing module receives the operating current compensating signal to compute a first operating current signal, a second operating current signal and a third operating current signal based on the operating current compensating signal according to the base power signal and a reference power signal. The current integrating module receives the threshold current compensating signal, the first operating current signal, the second operating current signal and the third operating current signal to generate a power control signal to drive the optical read/write module.

To achieve the above, a power control method of multi base powers is provided for an optical read/write module of an optical disk drive. The optical read/write module generates a power feedback signal and a temperature signal. The power control method includes the following steps: selecting one of a first base power signal and a second base power signal as a base power signal; generating an operating current compensating signal and a threshold compensating signal according to the power feedback signal, the temperature signal, the base power signal and a function relationship between the temperature signal and the threshold current of the optical read/write module; computing a first operating current signal, a second operating current signal and a third operating current signal based on the operating current compensating signal according to the base power signal and a reference power signal; and integrating the threshold current compensating signal, the first operating current signal, the second operating current signal and the third operating current signal to generate a power control signal to drive the optical read/write module.

As mentioned above, since the power control device and method of multi base powers according to the invention compensate the threshold current of the optical read/write module according to the temperature signal of the optical read/write module, the effect of the threshold current is regarded. And the distinct required operating currents driving the optical read/write module to generate different output power are computed base on multi base powers, such that the output power of the optical read/write module is precisely controlled.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 5:
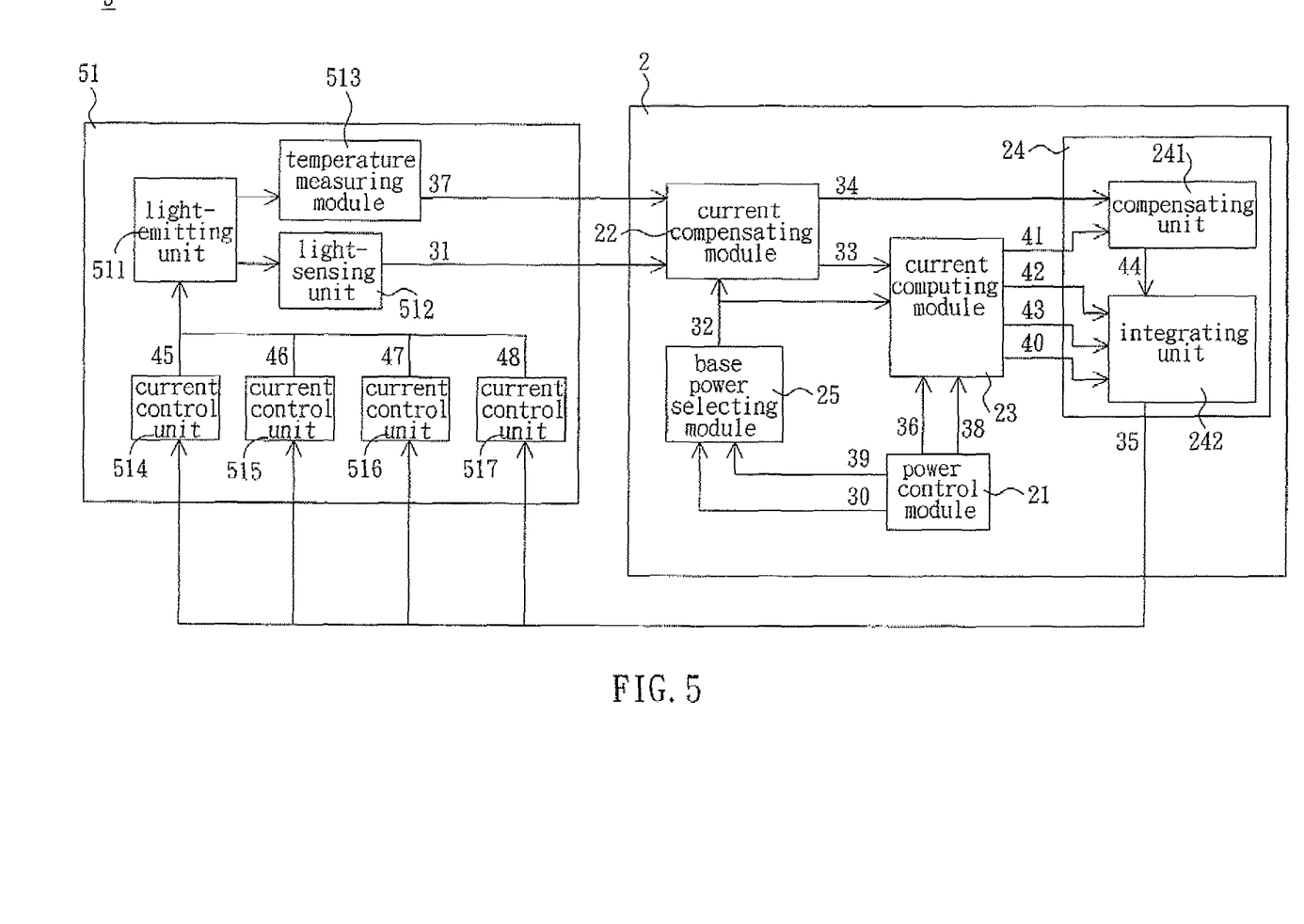
FIG. 5 is a block diagram showing a power control device of multi base powers according to a preferred embodiment of the invention.

Referring to FIG. 5, a power control device 2 of multi base powers includes a base power selecting module 25, a power control module 21, a current compensating module 22, a current computing module 23 and a current integrating module 24. The current integrating module 24 includes a compensating unit 241 and an integrating unit 242.

In this embodiment, the power control device 2 is provided to control an optical read/write module 51 in an optical disk drive 5. The optical read/write module 51 includes a light-emitting unit 511, a light-sensing unit 512, a temperature measuring unit 513, and digital-to-analog converting (DAC) units 514-517.

The DAC units 514-517 receive a power control signal 35 to generate currents 45-48 respectively. The light-emitting unit 511 is driven by the currents 45-48 to generate an output power. In general, the light-emitting unit 511 is implemented with a laser diode, therefore the temperature and the threshold current of the light-emitting unit 511 are related in an exponential relationship as shown if FIG. 3. When the temperature of the light-emitting unit 511 increases, the threshold current of the light-emitting unit 511 also increases. Thus an operating current driving the light-emitting unit 511 to light must be larger.

Besides, the light-measuring unit 512 measures the output power of the light-emitting unit 511 to generate a power feedback signal 31. The temperature measuring unit 513 measures the temperature of the light-emitting unit 511 to generate a temperature signal 37.

In this embodiment, the power control module 21 generates a first base power signal 39, a second base power signal 30 and two reference power signals 36 and 38. The base power selecting module 25 selects one of the first base power signal 39 and the second base power signal 30 as a base power signal 32.

Besides, the current compensating module 22 generates an operating current compensating signal 33 and a threshold compensating signal 34 according to the power feedback signal 31, the temperature signal 37, the base power signal 32 and a function relationship between the temperature and the threshold current of the light-emitting unit 511. The threshold current compensating signal 34 represents the threshold current of the light-emitting unit 511 at this moment. The required current, which drives the light-emitting unit 511 raise the output power from the current output power to the power represented by the base power signal 32, is represented by the operating current compensating signal 33.

In addition, the current computing module 23 receives the operating current compensating signal 33 to compute a first operating current signal 41, a second operating current signal 42, a third operating current signal 43 and a forth operating current signal 40 based on the operating current compensating signal 33 according to the base power signal 32 and the reference power signals 36 and 38.

The current integrating module 24 receives the threshold current compensating signal 34, the first operating current signal 41, the second operating current signal 42, third operating current signal 43, and a forth operating current signal 40 to generate the power control signal 35 to control the DAC units 514-517 to drive the light-emitting unit 511.

Figure 6:
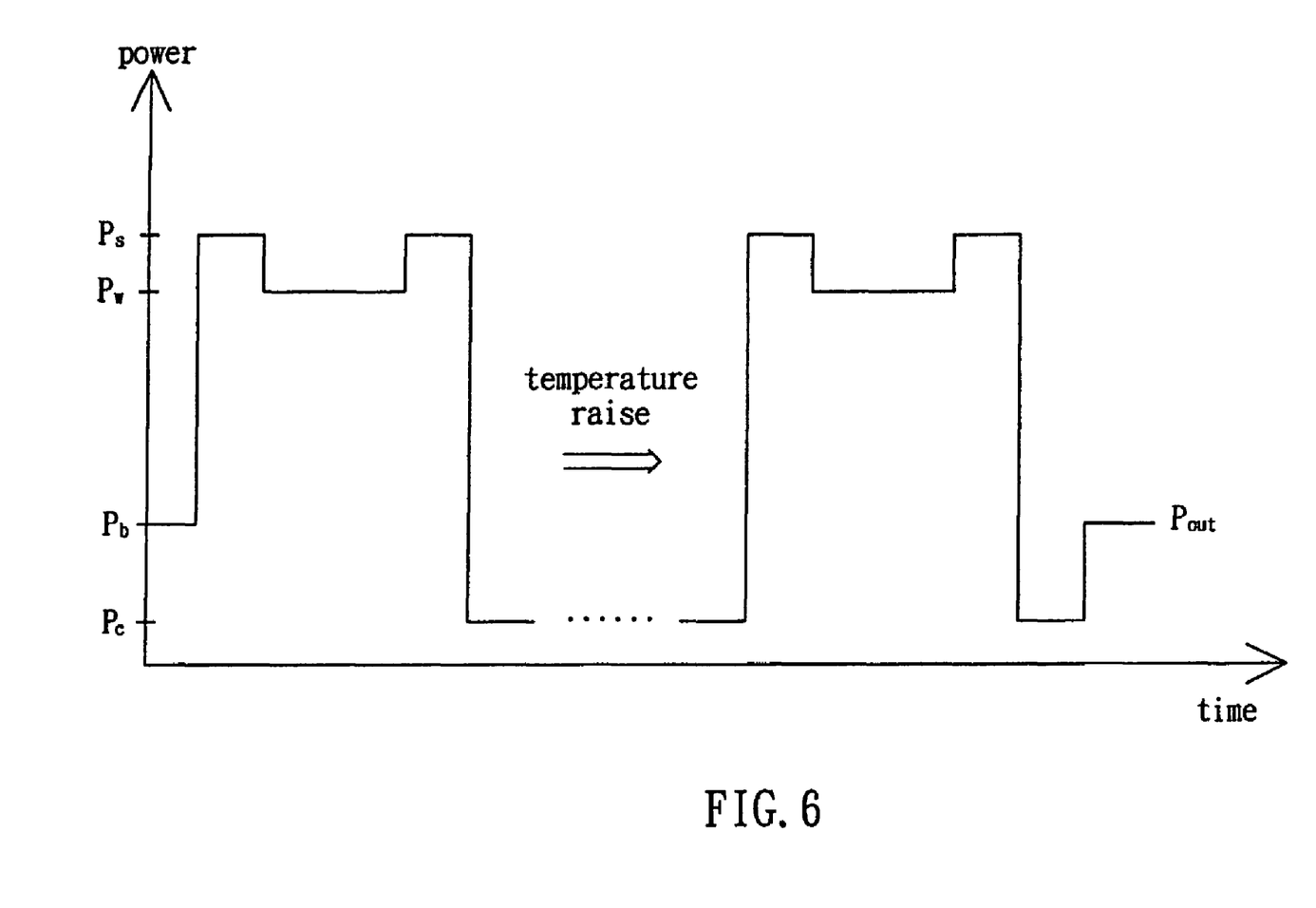
FIG. 6 is a schematic view showing the light-emitting unit of the power control device generates the output power in the castle writing strategy according to the preferred embodiment of the invention.
Figure 7:
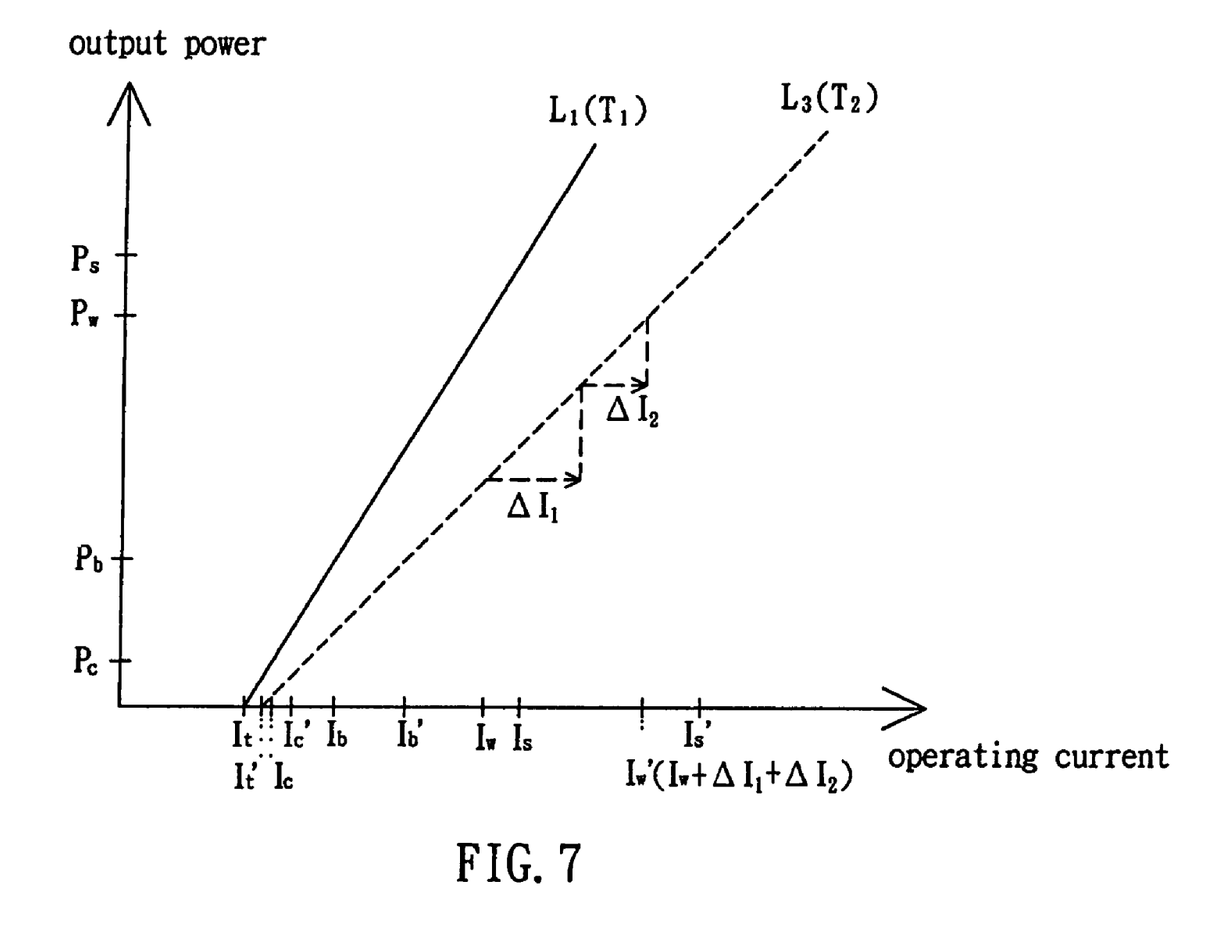
FIG. 7 is a curve relation diagram showing the light-emitting unit of the power control device generates the output power in the castle writing strategy according to the preferred embodiment of the invention.

Referring to FIG. 6, in a castle writing strategy, the first base power signal 39 and the second base power signal 30 of the power control device 2 are established according to a bias power ($P_b$) and a writing power ($P_w$), and the reference power signals 36 and 38 are established according to a writing power ($P_s$) and a cooling power ($P_c$). This writing strategy is set up based on the demand for the output power of the optical read/write module in the specification (ex: DVD+R, DVD-R or other optical disk specification).

Figure 8:
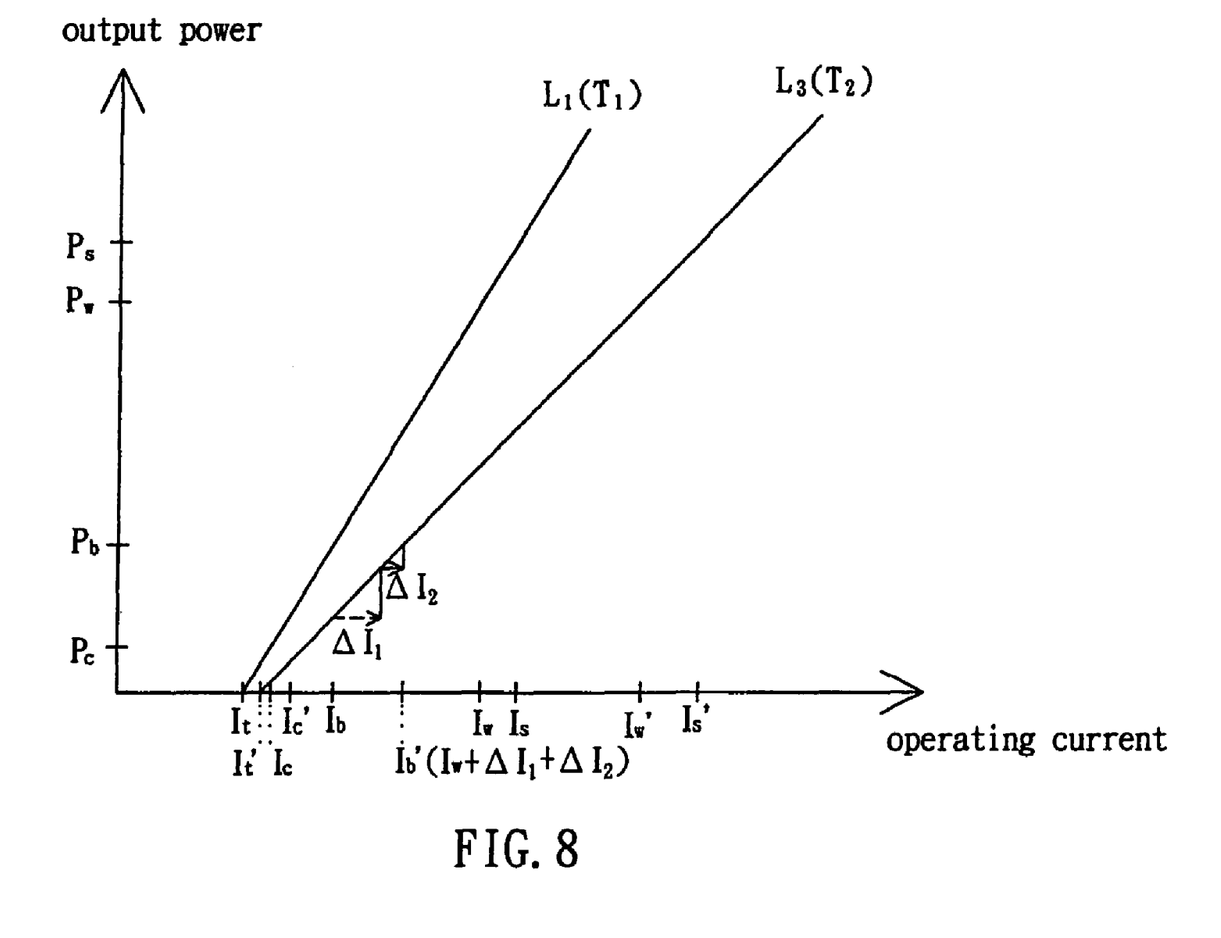
FIG. 8 is another curve relation diagram showing the light-emitting unit of the power control device generates the output power in the castle writing strategy according to the preferred embodiment of the invention.

When the temperature of the light-emitting unit 511 is at temperature $T_1$, the output power and the operating current of the light-emitting unit 511 are related in lines $L_1$ as shown in FIG. 8. At this moment, the threshold current compensating signal 34, the first operating current signal 41, the second operating current signal 42, the third operating current signal 43, and the forth operating current signal 40 represent currents $I_t$, $I_c-I_t$, $I_b-I_c$, $I_w-I_b$, and $I_s-I_w$. The compensating unit 241 generates the first threshold current signal 44 ($I_c$) according to the threshold current compensating signal 34 ($I_t$), the first operating current signal 41 ($I_c-I_t$). In addition, the integrating unit 242 generates the power control signal 35 according to the first threshold current signal 44, the second operating current signal 42, the third operating current signal 43, and the forth operating current signal 40. Therefore the DAC unit 514, 515 are controlled to generate the currents 45-48 as current $I_b-I_c$, $I_w-I_b$, and $I_s-I_w$. Thus, the light-emitting unit 511 is driven by the combinations of the currents 45-48 to generate different output powers (ex: $P_c$, $P_b$, $P_w$, and $P_s$).

When the temperature of the light-emitting module 41 raises to the temperature $T_2$, the output power and the operating current of the light-emitting unit 511 are related in lines $L_3$.

At this time, the base power selecting module 25 selects the second base power signal 30 ($P_w$) as the base power signal 32. The current compensating module 22 of the power control device 2 computes a difference ($I_t'-I_t$) of threshold current at temperature $T_1$ and $T_2$ according to the temperature signal 37. The current compensating module 22 computes the required operating current ($\Delta I_1$), which drives the light-emitting unit 511 to generate correct power, according to the base power signal 32 and the power feedback signal 31 in the way of a close loop feedback control. Then the current compensating module 22 compare the required operating current ($\Delta I_1$) and the difference of the threshold current ($I_t'-I_t$) to output the threshold current compensating signal 34 ($I_t'$) and the operating current compensating signal 33 ($\Delta I_1-I_t'$).

The current computing module 23 update the first operating current signal 41, the second operating current signal 42, the third operating current signal 43 and the forth operating current signal 40 according to the proportion of the reference power signal 36 to the base power signal 32 as shown in formula (2) to (5).

$$S'_{41} = S_{32} \times \frac{P_c}{P_w} + S_{41} = (\Delta I_1 - I_t) \times \frac{P_c}{P_w} + I_c \quad (2)$$

$$S'_{42} = S_{32} \times \frac{P_b - P_c}{P_w} + S_{42} = (\Delta I_1 - I_t) \times \frac{P_b - P_c}{P_w} + (I_b - I_c) \quad (3)$$

$$S'_{43} = S_{32} \times \frac{P_w - P_b}{P_w} + S_{43} = (\Delta I_1 - I_t) \times \frac{P_w - P_b}{P_w} + (I_w - I_b) \quad (4)$$

$$S'_{40} = S_{32} \times \frac{P_s - P_w}{P_w} + S_{40} = (\Delta I_1 - I_t) \times \frac{P_s - P_w}{P_w} + (I_s - I_w) \quad (5)$$

$S_{41}$: the previous first operating current signal 41

$S_{41}'$: the update first operating current signal 41

$S_{42}$: the previous second operating current signal 42

$S_{42}'$: the update second operating current signal 42

$S_{43}$: the previous second operating current signal 43

$S_{43}'$: the update second operating current signal 43

$S_{40}$: the previous second operating current signal 40

$S_{40}'$: the update second operating current signal 40

$S_{32}$: the base power signal

The current integrating module 24 receives the threshold current signal 34, the first operating current signal 41, the second operating current signal 42, the third operating current signal 43 and the forth operating current signal 40 to generate the power control signal 35. After the DAC units 514-517 are controlled by the power control signal 35 to drive the light-emitting unit 511, the current compensating module 22 computes the required operating current ($\Delta I_2$) again according to the base power signal 32 and the power feedback signal 31 in the way of a close loop feedback control. Because the temperature of the light-emitting unit 511 does not change, the current compensating module 22 does not need to compensate the threshold current of the light-emitting unit 511, and it outputs the threshold current compensating signal 34 ($I_t'$) and the operating current compensating signal 33 ($\Delta I_2$).

Then the current computing module 23 updates the first operating current signal 41, the second operating current signal 42, the third operating current signal 43 and the forth operating current signal 40 according to the proportion of the reference power signal 36 to the base power signal 32 as shown in formula (6) and (9).

$$S'_{41} = S_{32} \times \frac{P_c}{P_w} + S_{41} = \Delta I_2 \times \frac{P_c}{P_w} + \left((\Delta I_1 - I_t) \times \frac{P_c}{P_w} + I_c\right) = I'_c \quad (6)$$

$$S'_{42} = S_{32} \times \frac{P_b - P_c}{P_w} + S_{42} = \Delta I_2 \times \frac{P_b - P_c}{P_w} + \quad (7)$$

$$\left((\Delta I_1 - I_t) \times \frac{P_b - P_c}{P_w} + (I_b - I_c)\right)$$

$$= (\Delta I_1 + \Delta I_2 - I_t) \times \frac{P_b - P_c}{P_w} + (I_b - I_c) = I'_b - I'_c$$

$$S'_{43} = S_{32} \times \frac{P_w - P_b}{P_w} + S_{43} = \Delta I_2 \times \frac{P_w - P_b}{P_w} + \quad (8)$$

$$\left((\Delta I_1 - I_t) \times \frac{P_w - P_b}{P_w} + (I_w - I_b)\right)$$

$$= (\Delta I_1 + \Delta I_2 - I_t) \times \frac{P_w - P_b}{P_w} + (I_w - I_b) = I'_w - I'_b$$

$$S'_{40} = S_{32} \times \frac{P_s - P_w}{P_w} + S_{40} = \Delta I_2 \times \frac{P_s - P_w}{P_w} + \quad (9)$$

$$\left((\Delta I_1 - I_t) \times \frac{P_s - P_w}{P_w} + (I_s - I_w)\right)$$

$$= (\Delta I_1 + \Delta I_2 - I_t) \times \frac{P_s - P_w}{P_w} + (I_s - I_w) = I'_s - I'_w$$

The compensating unit 241 updates the first threshold current signal 44, thus the integrating unit 242 control the DAC units 514-517 to generate currents 45-48 as currents $I_c'$, $I_b'-I_c'$, $I_w'-I_b'$, and $I_s'-I_w'$. Therefore the currents 45-48 drive the light-emitting unit 511 to generate the output power $P_c$, $P_b$, $P_w$, and $P_s$.

Otherwise, referring to FIG. 8, with difference to above, the base power selecting module 25 selects the first base power signal 30 ( ) as base power signal 32 at this moment. The current computing 23 repeats the formulas (2) to (9) with power $P_b$ in substitution for power $P_w$ in denominator, and controls the currents 45-48 as currents $I_c'$, $I_b'-I_c'$, $I_w'-I_b'$, and $I_s'-I_w'$ respectively. Thus the currents 45/48 drive the light-emitting unit 511 to generate the output power $P_c$, $P_b$, $P_w$, and $P_s$. In conclusion, when the temperature of the light-emitting unit 511 raise and control by the above method, the output power $P_{out}$ of the light-emitting unit 511 is controlled precisely at the bias power $P_b$, the writing power $P_w$, the writing power $P_s$, and the cooling power PC in the castle writing strategy.

Figure 9:
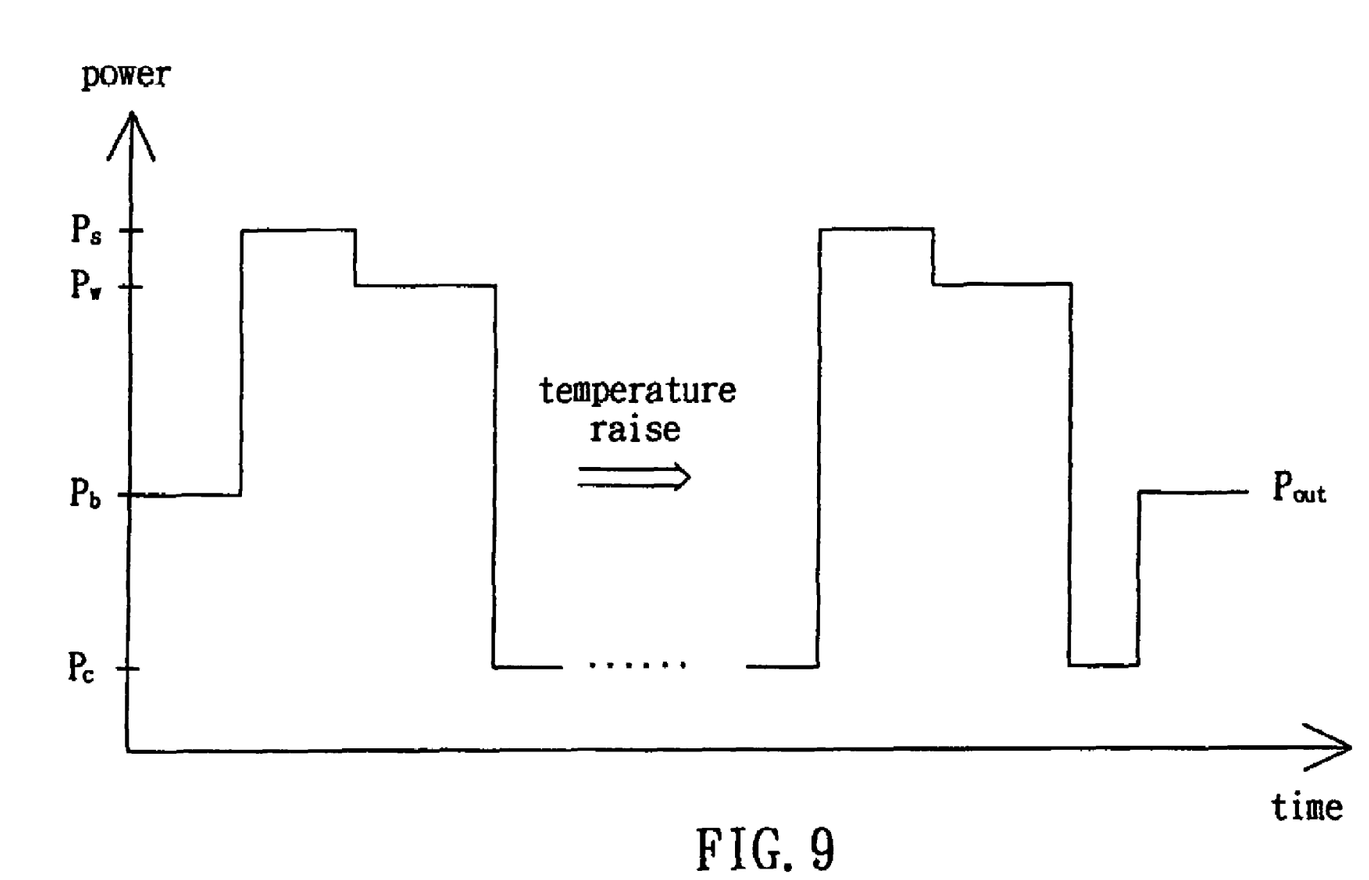
FIG. 9 is a schematic view showing the light-emitting unit of the power control device generates the output power in the block strategy according to the preferred embodiment of the invention.

Similarly, referring to FIG. 9, in a block writing strategy, the first base power signal 39 and the second base power signal 30 of the power control device 2 are established according to a bias power ($P_b$) and a writing power ($P_w$), and the reference power signals 36 and 38 are established according to a writing power ($P_s$) and a cooling power ($P_c$). This writing strategy is set up based on the demand for the output power of the optical read/write module in the specification (ex: DVD+R, DVD-R or other optical disk specification). With the same control method described above, the output power $P_{out}$ of the light-emitting unit 511 is controlled precisely at the bias power $P_b$, the writing power $P_w$, the writing power $P_s$, and the cooling power PC in the block writing strategy.

Figure 10:
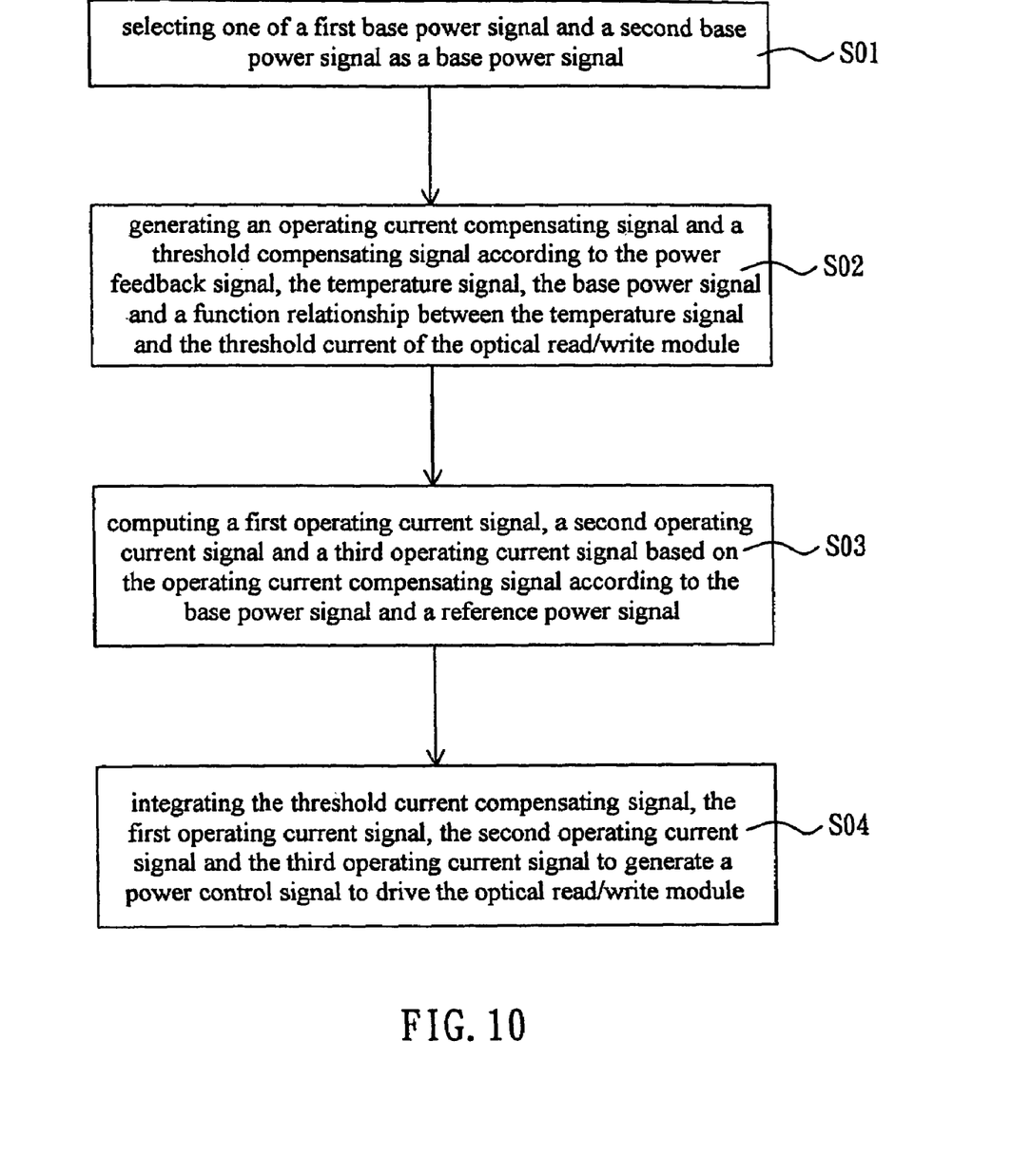
FIG. 10 is a flow chart showing a power control method of multi base powers according to a preferred embodiment of the invention.

Referring to FIG. 10, a power control method of multi base powers according to a preferred embodiment of the invention is provided for an optical read/write module of an optical disk drive. The optical read/write module generates a power feedback signal and a temperature signal. The power control method includes steps S01-S04. The step S01 selects one of a first base power signal and a second base power signal as a base power signal. The step S02 generates an operating current compensating signal and a threshold compensating signal according to the power feedback signal, the temperature signal, the base power signal and a function relationship between the temperature signal and the threshold current of the optical read/write module. The step S03 computes a first operating current signal, a second operating current signal and a third operating current signal based on the operating current compensating signal according to the base power signal and a reference power signal. The step S04 integrates the threshold current compensating signal, the first operating current signal, the second operating current signal and the third operating current signal to generate a power control signal to drive the optical read/write module. The power control method in the embodiment can be applied to the power control method device as mentioned in the above embodiment as shown in FIG. 5 to FIG. 9. Thus, the power control method of this embodiment can be realized with referring to the previous embodiment, and the detailed descriptions are omitted here.

In summary, since the power control device and method of multi base powers according to the invention compensate the threshold current of the optical read/write module according to the temperature signal of the optical read/write module, the effect of the threshold current is regarded. And the distinct required operating currents driving the optical read/write module to generate different output power are computed base on multi base powers, such that the output power of the optical read/write module is precisely controlled Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A power control device of multi base powers for an optical read/write module of an optical disk drive, wherein the optical read/write module generates a power feedback signal and a temperature signal, the device comprising:

a base power selecting module for selecting one of a first base power signal and a second base power signal to output a base power signal;

a current compensating module for generating an operating current compensating signal and a threshold compensating signal according to the power feedback signal, the temperature signal, the base power signal and a function relationship between the temperature signal and the threshold current of the optical read/write module;

a current computing module for receiving the operating current compensating signal to compute a first operating current signal, a second operating current signal and a third operating current signal based on the operating current compensating signal according to the base power signal and a reference power signal;

a current integrating module for receiving the threshold current compensating signal, the first operating current signal, the second operating current signal and the third operating current signal to generate a power control signal to drive the optical read/write module.

2. The power control device of multi base powers as recited in claim 1, wherein the current compensating module receives the temperature signal to generate the threshold current compensating signal according to the function relationship between the temperature signal and the threshold current of the optical read/write module, and receives the power feedback signal and the base power signal to generate the operating current compensating signal according to a proportion of the power feedback signal to the base power signal.

3. The power control device of multi base powers as recited in claim 1, wherein the optical read/write module receives the power control signal to generate an output power equal to the power represented by the base power signal.

4. The power control device of multi base powers as recited in claim 1, wherein the current integrating module comprises:
a compensating unit for receiving the threshold current compensating signal and the first operating current signal to sum the threshold current compensating signal and the first operating current signal to output a first threshold current signal; and
a integrating unit for receiving the first threshold current signal and the second operating current signal to generate the power control signal, and the optical read/write module receives the power control signal to generate an output power equal to the power represented by the base power signal.

5. The power control device of multi base powers as recited in claim 1, wherein the optical read/write module receives the power control signal to generate an output power equal to the power represented by the reference power signal.

6. The power control device of multi base powers as recited in claim 1, wherein the current integrating module comprises:
a compensating unit for receiving the threshold current compensating signal and the first operating current signal to sum the threshold current compensating signal and the first operating current signal to output a first threshold current signal; and
a integrating unit for receiving the first threshold current signal and the second operating current signal to generate the power control signal, and the optical read/write module receives the power control signal to generate an output power equal to the power represented by the reference power signal.

7. The power control device of multi base powers as recited in claim 1, wherein the first base power signal, the second power signal, and the reference power signal are established according to a bias power, a writing power, and a cooling power in a castle writing strategy.

8. The power control device of multi base powers as recited in claim 1, wherein the first base power signal, the second power signal, and the reference power signal are established according to a bias power, a writing power, and a cooling power in a block writing strategy.

9. The power control device of multi base powers as recited in claim 1, wherein the optical read/write module comprises:
a current control unit for receiving the power control signal to generate an operating current;
a light-emitting unit driven by the operating current to generate an output power wherein the function relationship is an exponential relationship between the temperature and the threshold current of the light-emitting unit;
a light-sensing unit for measuring the output power to generate the power feedback signal; and
a temperature measuring unit for measuring the temperature of the optical read/write module to generate the temperature signal.

10. A power control method of multi base powers for an optical read/write module of an optical disk drive, wherein the optical read/write module generates a power feedback signal and a temperature signal, the method comprising:
selecting one of a first base power signal and a second base power signal as a base power signal;
generating an operating current compensating signal and a threshold compensating signal according to the power feedback signal, the temperature signal, the base power signal and a function relationship between the temperature signal and the threshold current of the optical read/write module;
computing a first operating current signal, a second operating current signal and a third operating current signal based on the operating current compensating signal according to the base power signal and a reference power signal; and
integrating the threshold current compensating signal, the first operating current signal, the second operating current signal and the third operating current signal to generate a power control signal to drive the optical read/write module.

11. The power control method of multi base powers as recited in claim 10, wherein the generating step generates the threshold current compensating signal according to the function relationship between the temperature signal and the threshold current of the optical read/write module, and generates the operating current compensating signal according to a proportion of the power feedback signal to the base power signal.

12. The power control method of multi base powers as recited in claim 10, wherein the optical read/write module receives the power control signal to generate an output power equal to the power represented by the base power signal.

13. The power control method of multi base powers as recited in claim 10, wherein the current integrating module comprises:
summing the threshold current compensating signal and the first operating current signal to output a first threshold current signal; and
integrating the first threshold current signal and the second operating current signal to generate the power control signal, and the optical read/write module receives the power control signal to generate an output power equal to the power represented by the base power signal.

14. The power control method of multi base powers as recited in claim 10, wherein the optical read/write module receives the power control signal to generate an output power equal to the power represented by the reference power signal.

15. The power control method of multi base powers as recited in claim 10, wherein the integrating step comprises:
summing the threshold current compensating signal and the first operating current signal to output a first threshold current signal; and
integrating the first threshold current signal and the second operating current signal to generate the power control signal, and the optical read/write module receives the power control signal to generate an output power equal to the power represented by the reference power signal.

16. The power control method of multi base powers as recited in claim 10, wherein the first base power signal, the second power signal, and the reference power signal are established according to a bias power, a writing power, and a cooling power in a castle writing strategy.

17. The power control method of multi base powers as recited in claim 10, wherein the first base power signal, the second power signal, and the reference power signal are established according to a bias power, a writing power, and a cooling power in a block writing strategy.

18. The power control method of multi base powers as recited in claim 10, wherein the optical read/write module comprises:

a current control unit for receiving the power control signal to generate an operating current;

a light-emitting unit driven by the operating current to generate an output power wherein the function relationship is an exponential relationship between the temperature and the threshold current of the light-emitting unit;

a light-sensing unit for measuring the output power to generate the power feedback signal; and a temperature measuring unit for measuring the temperature of the optical read/write module to generate the temperature signal.

\* \* \* \* \*

UNITED STATES PATENT AND TRADEMARK OFFICE
CERTIFICATE OF CORRECTION

PATENT NO.        : 7,668,067 B2                                   Page 1 of 1
APPLICATION NO.   : 11/429942
DATED             : February 23, 2010
INVENTOR(S)       : Lai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 900 days.

Signed and Sealed this

Twenty-eighth Day of December, 2010

David J. Kappos
*Director of the United States Patent and Trademark Office*